United States Patent [19]

Meehan et al.

[11] Patent Number: 5,592,792

[45] Date of Patent: Jan. 14, 1997

[54] SELF SEALING POTATO TRUCK LOADING DOCK

[76] Inventors: Craig F. Meehan, 211 Third Ave. SE., New Rockford, N. Dak. 58365; Lyle G. Forde, 220 Seventh Ave. North, Carrington, N. Dak. 58421

[21] Appl. No.: 493,097

[22] Filed: Jun. 21, 1995

[51] Int. Cl.$^6$ .................................................. E04B 1/34
[52] U.S. Cl. .................................... 52/173.2; 160/184
[58] Field of Search ............................. 52/173.2, 63, 222; 160/184, 332

[56] References Cited

U.S. PATENT DOCUMENTS

| | | | |
|---|---|---|---|
| 3,461,627 | 8/1969 | Conger | 52/173.2 |
| 3,772,839 | 11/1973 | Timbers | 52/173.2 |
| 4,381,631 | 5/1983 | Frommelt | 52/173 |
| 4,384,606 | 5/1983 | Johnson et al. | 160/184 X |
| 4,516,366 | 5/1985 | Alten | 52/173 |
| 4,601,142 | 7/1986 | Frommelt | 52/173.2 |
| 4,724,648 | 2/1988 | Depholder | 52/173 |
| 4,799,342 | 1/1989 | Klevnjans | 52/173 |
| 4,805,362 | 2/1989 | Frommelt et al. | 52/173 |
| 4,825,606 | 5/1989 | Alten | 52/173 |
| 4,873,800 | 10/1989 | Frommelt et al. | 52/173 |
| 4,873,801 | 10/1989 | Winters | 52/173 |
| 5,167,101 | 12/1992 | Alten | 52/173 |
| 5,174,075 | 12/1992 | Alten | 52/173 |
| 5,174,084 | 12/1992 | Alten | 52/173 |
| 5,185,977 | 2/1993 | Brockman et al. | 52/173 |
| 5,195,285 | 3/1993 | Alten | 52/173 |
| 5,282,342 | 2/1994 | Brockman et al. | 52/173 |
| 5,341,613 | 8/1994 | Brockman et al. | 52/173.2 |
| 5,345,733 | 9/1994 | Brockman et al. | 52/173.2 |
| 5,473,846 | 12/1995 | Giuliani et al. | 52/173.2 |

FOREIGN PATENT DOCUMENTS

8500050  1/1985  WIPO .................................. 160/184

*Primary Examiner*—Lanna Mai
*Attorney, Agent, or Firm*—Curtis V. Harr

[57] ABSTRACT

A self sealing potato truck loading dock is disclosed. This loading dock provides an effective air tight seal which serves to isolate the interior of a warehouse and the potato truck box from the outside air while said truck is being loaded or unloaded. This seal is accomplished by providing a series of double layered sealing canvases that encircle the entire opening of the loading dock opening. These double layered sealing canvases provide an air tight seal between the body of the potato truck box and the outside air by using a system of alternating slits in the respective layers of the sealing canvases and elastic bungee cords attached inside of the sealing canvases.

9 Claims, 7 Drawing Sheets

SELF SEALING POTATO TRUCK LOADING DOCK

BACKGROUND OF THE INVENTION

The present invention relates to a loading dock for large trucks. More specifically, a loading dock which provides an air tight seal during the loading and unloading of potato trucks at a potato warehouse. The Self Sealing Potato Truck Loading Dock provides a method of obtaining such a seal around the unique rear configuration of potato trucks used in the transportation of the harvested crop.

The loading docks that are currently used in the loading and unloading of trucks consist of two different types. The first of these consists of compressible pads that are fixed around the outside edge of the warehouse door. With this type of sealing mechanism, a truck backs up against these pads and the most rearward surface of the truck box engages and compresses these pads, thereby forming the desired isolation of the inside of the warehouse and the truck from the outside air. The second type uses a fabric curtain around the warehouse door. When engaged, the fabric curtain is draped around the outside of the most rearward portion of the truck box, thereby creating the desired air seal.

In the past, potato trucks were forced to use one of the above two types of sealing mechanisms that were designed for use with standard, or rectangular, truck boxes. While these standard loading docks provide an adequate seal for regular truck boxes, the box of a potato truck presents special problems in this respect. The potato truck box is not rectangular in its longitudinal profile as is the box of a standard truck. Rather, it more closely resembles a diamond shape with its side walls angled toward the center of the box at their upper and lower extremes.

Also, the potato truck box is equipped with a conveyor at the bottom center of the box which runs the entire length of the box. The conveyor is used to move the potatoes from the box to the rear during unloading. The conveyor extends beyond the most rearward portion of the potato truck's box and this, along with the angled sides of the box, creates the problem that makes any presently employed method of providing an air tight seal between an unloading truck and a warehouse ineffective when used with a potato truck.

The providing of an air tight seal, and thereby isolating the interior of the warehouse and the inside of the truck box from the outside air, has very important safety considerations for those involved in the loading and unloading of potato trucks. The harvesting of potatoes takes place in the fall of the year when the weather is typically damp and cool and very often the potatoes are transported from warehouses to processing plants during the cold winter months. The difference in air temperature from the outside to the inside of the warehouse often creates a thick fog in and around the work area when there is an ineffective seal between the box of the truck and the warehouse. The presence of the fog has the effect of greatly reducing the visibility in the work area and often results in accidents due to the nature of the heavy equipment used in and around the loading dock area.

From the forgoing discussion, it can be seen that a method of providing an effective air tight seal between the box of an unloading or loading potato truck and the loading dock of a warehouse is highly desirable. The prior art is ineffective in this application because the designs are intended to be used with the rectangular shapes of standard truck boxes. This creates a problem in their use with a potato truck box because it leaves areas around the box completely open to the outside air due to the irregular shape of a potato truck box. Thus, allowing the outside air to enter the warehouse and create the dangerous working conditions of fog limited visibility.

The present invention accomplishes the described objective by providing a series of double layered sealing canvases that effectively and completely encircle the irregular shape of the rear surface of the box of a potato truck. This configuration provides an air tight seal between the cold and damp outside air and the interior of the warehouse. The present invention also has the added advantage of being compatible with standard, rectangular truck boxes.

SUMMARY OF THE INVENTION

Accordingly, it is the objective of the present invention to provide a effective air tight seal which serves to isolate the interior of a warehouse and the potato truck box from the outside air while said truck is being loaded or unloaded. More specifically, it is the objective of the present invention to provide a method of sealing the areas of the potato truck box that are constructed in a diagonal manner in reference to the vertical side walls of the truck box.

Additionally, it is another objective of the present invention to provide an effective, air tight seal for the area of the potato truck box that extends out beyond the rear of the box due to the unloading conveyor located at the bottom center of said box.

The present invention accomplishes these objectives by providing a series of double layered sealing canvases that encircle the entire opening of the loading dock. These double layered sealing canvases provide an air tight seal between the body of the potato truck box and the outside air by using a system of alternating slits in the respective layers of the sealing canvases and elastic bungee cords attached inside of the sealing canvases. It is the flexibility and elasticity of the bungee cords that allows the outside edges of the present invention to conform with the irregular surface of the potato truck box and provide the desired air seal. Also, the flexibility afforded to the sealing canvases by the alternating slits allows the canvases to stretch when necessary while maintaining the required barrier to the outside air.

Another design feature of the present invention which adds to its versatility is that the sealing canvases may be permanently attached to a moveable frame. This allows the whole structure to be easily moved and positioned in front of any loading dock where needed for the loading or unloading of potato trucks.

In the manner described, the present invention provides a method of providing the required air tight seal along both the diagonal surfaces of a potato truck box and the extended portion of the unloading conveyor. Thus eliminating the problem of cold air induced fog in the work area.

DESCRIPTION OF THE DRAWINGS

FIG. 4 is rear elevation view from inside the warehouse showing a potato truck's orientation when engaged to the Self Sealing Potato Truck Loading Dock. FIG. 4 also shows the top, side, and bottom double layered sealing canvases and their orientation to the back of the potato truck when in the engaged position.

DESCRIPTION OF THE PREFERRED EMBODIMENT

Figure 1:
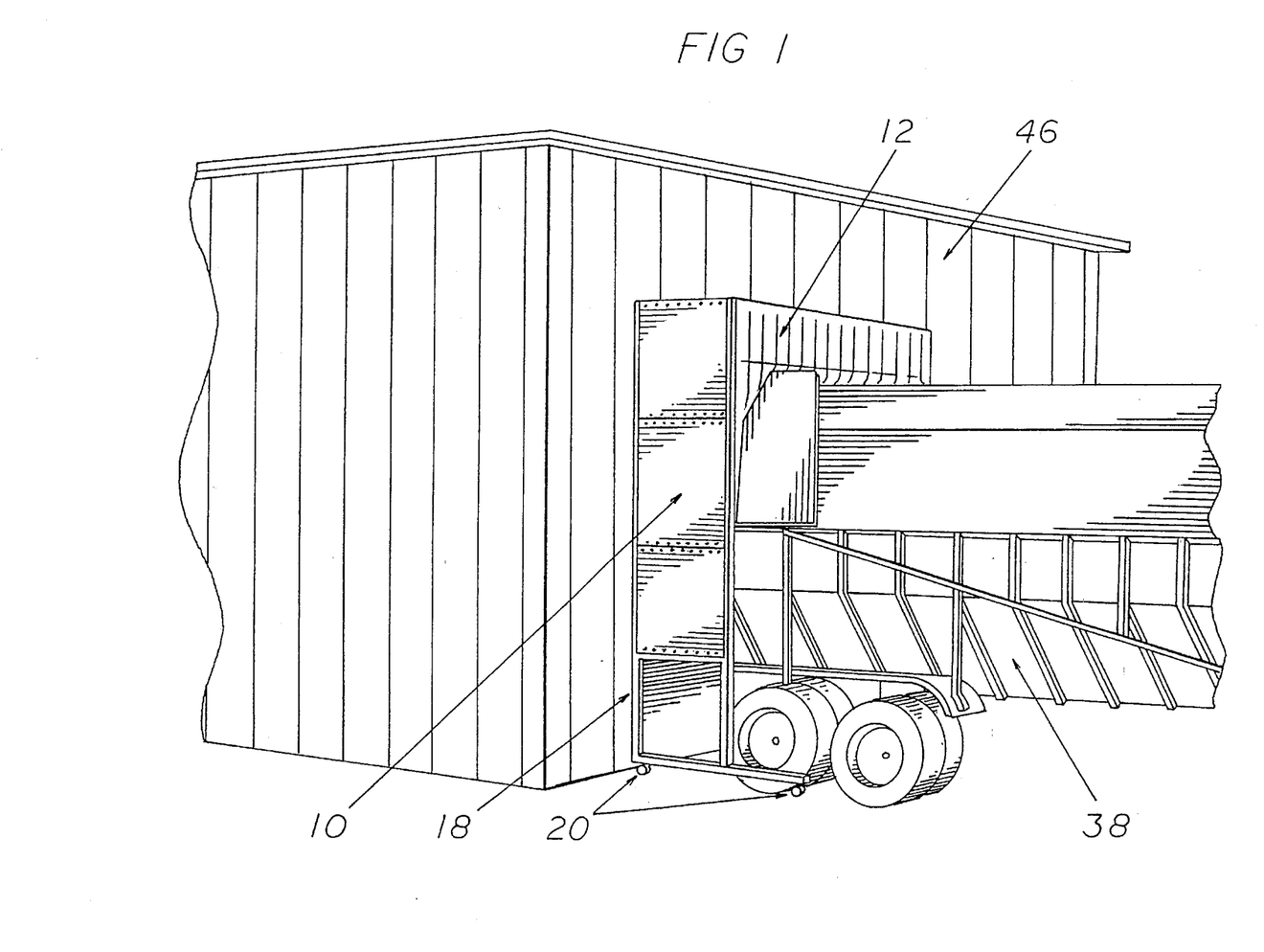
FIG. 1 is a perspective view of the Self Sealing Potato Truck Loading Dock showing its orientation to a warehouse and also showing the manner in which a potato truck backs up to the Self Sealing Potato Truck Loading Dock to load or unload potatoes.

As shown by FIG. 1, the Self Sealing Potato Truck Loading Dock 10 is transportable by means of the wheels 20 located at the bottom of the frame 18. The Self Sealing Potato Truck Loading Dock 10 is placed against the front of the warehouse 46 enabling a potato truck 38 to back up and load or unload while the top double layered sealing canvas 12 seals around the outside of the rear end of said potato truck 38. This configuration allows for the creation of an air seal around the perimeter of the potato truck, thereby eliminating outside air flow into the warehouse.

Figure 2:
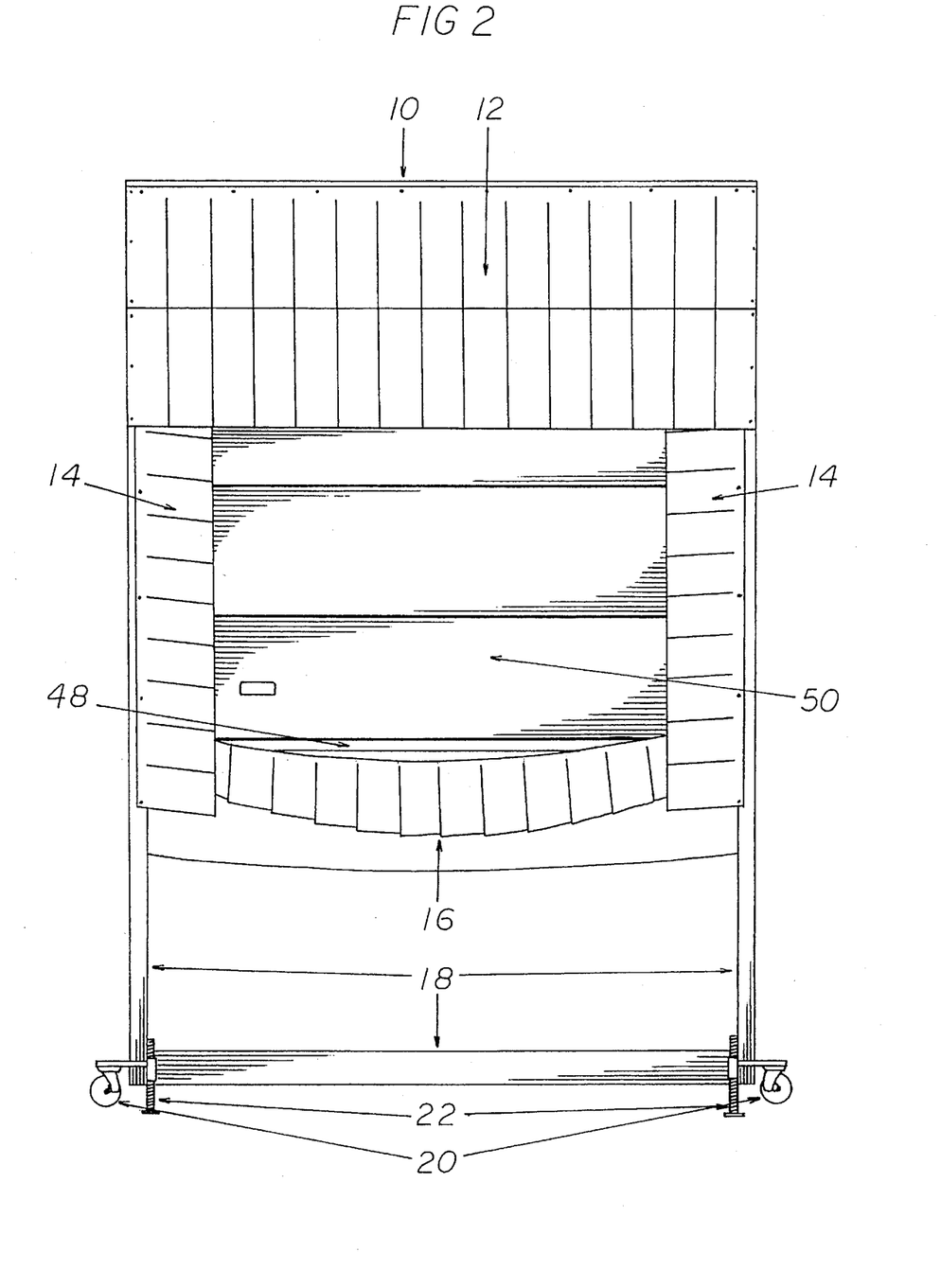
FIG. 2 is a front elevation view of the Self Sealing Potato Truck Loading Dock showing the orientation of the top, side, and bottom double layered sealing canvases to the warehouse loading dock door.
Figure 3:
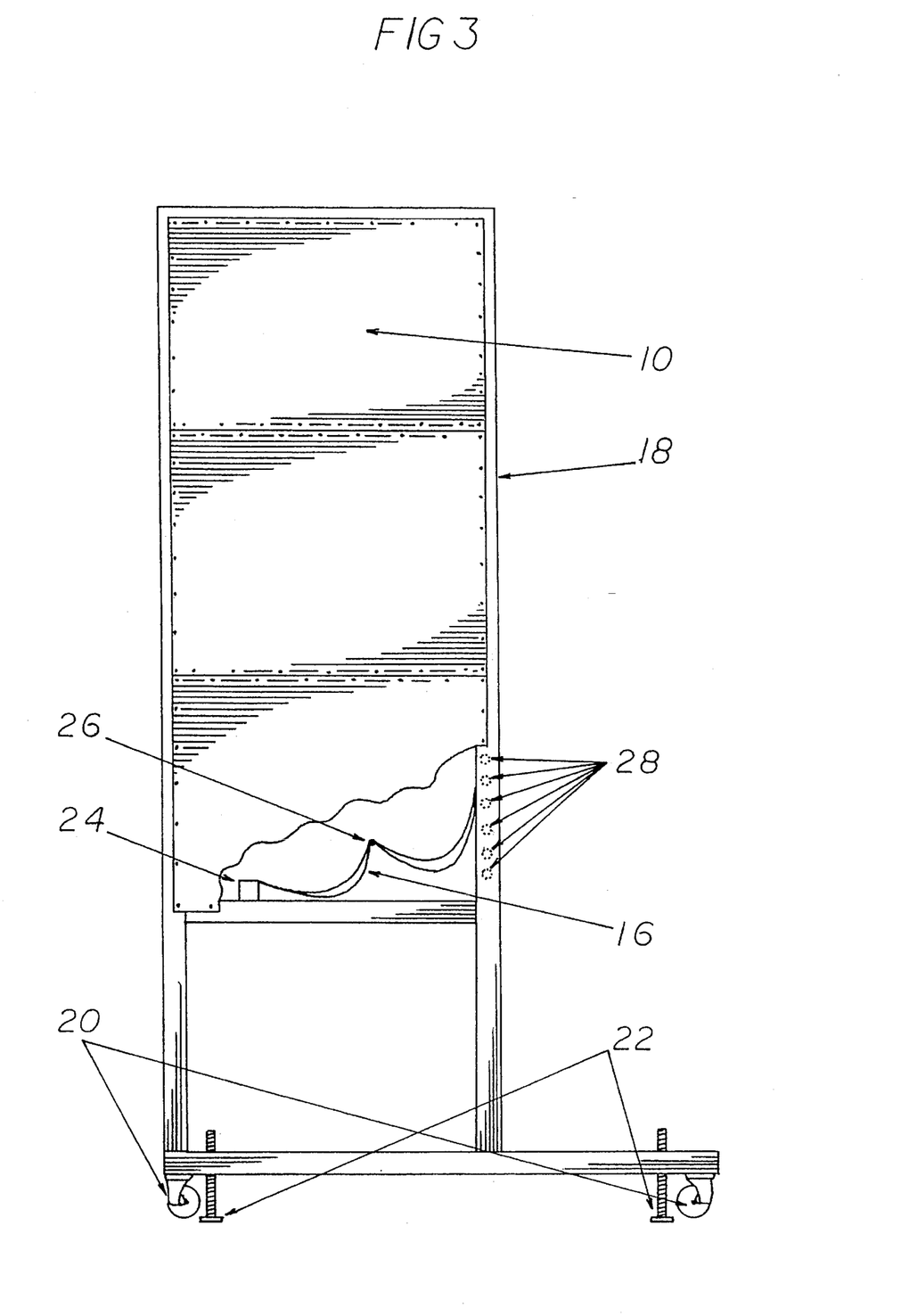
FIG. 3 is a side elevation cut-away view of the Self Sealing Potato Truck Loading Dock showing the orientation of the bottom double layered sealing canvas, the wheels, and the leveling pads to the frame of the present invention.

As shown by FIGS. 2 and 3, the Self Sealing Potato Truck Loading Dock 10 fits over the front of the warehouse loading dock 48 and loading dock door 50. The frame 18 of the Self Sealing Potato Truck Loading Dock 10 is lifted off of the wheels 20 and leveled when in position by use of the stabilizing pads 22. The top double layered sealing canvas 12, the side double layered sealing canvas 14, and the bottom double layered sealing canvas 16 are mounted to the outside of the frame 18 and enclose the area of the warehouse loading dock door 50.

The bottom double layered sealing canvas 16, is mounted at its most rearward end to the rear double layered sealing canvas mount 24 and at its most forward end to one of the front double layered sealing canvas adjustment pins 28. The configuration of these pins allows for the adjustment of the bottom double layered sealing canvas 16 in order to conform with potato trucks of varying heights and designs. The double layered sealing canvases 12, 14, and 16 are internally fitted with a elastic bungee cord 26 which serves to conform and hold the sealing canvases 12, 14, and 16 to the irregular shape of the potato truck box 44.

Figure 4:
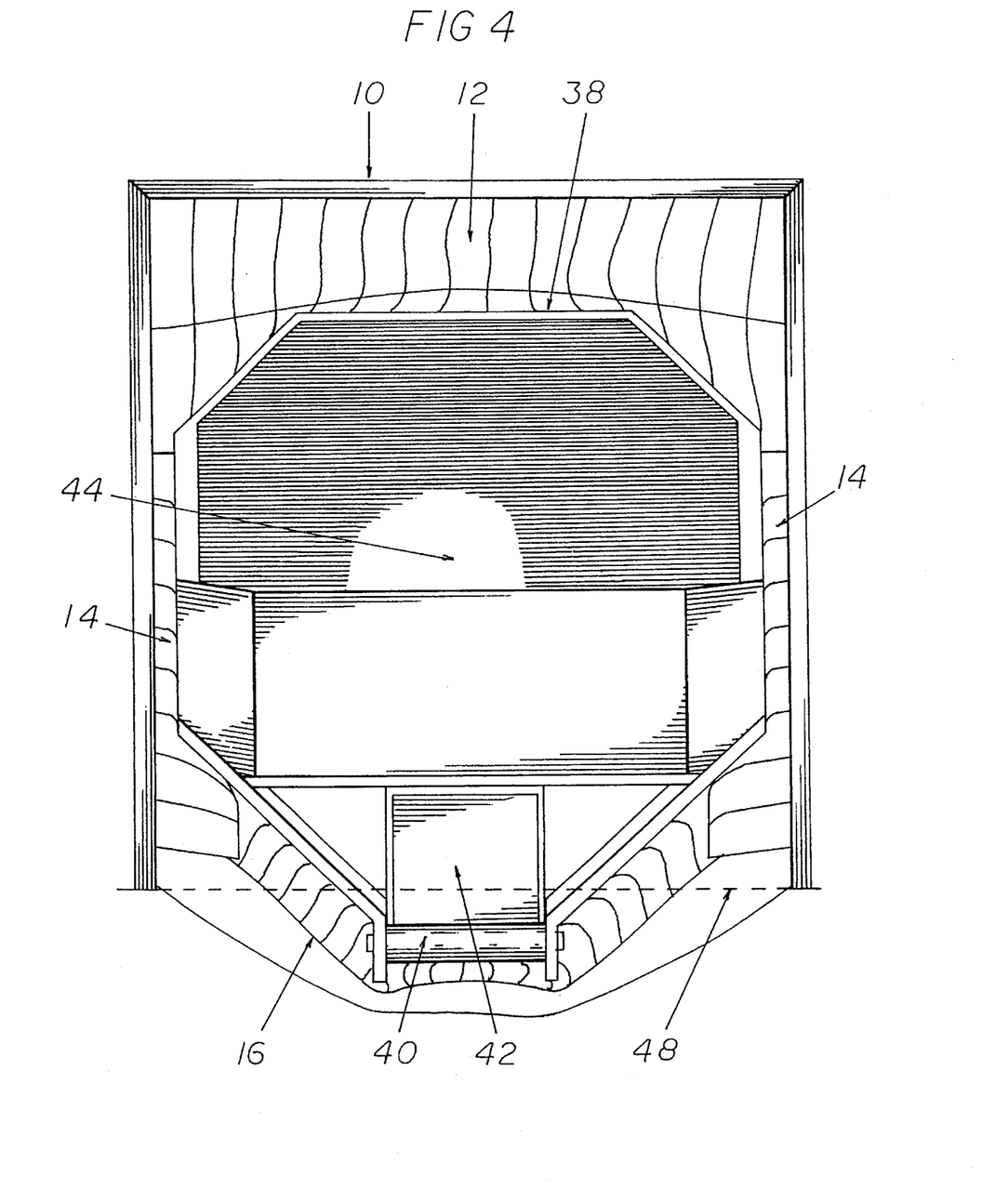
Figure 5:
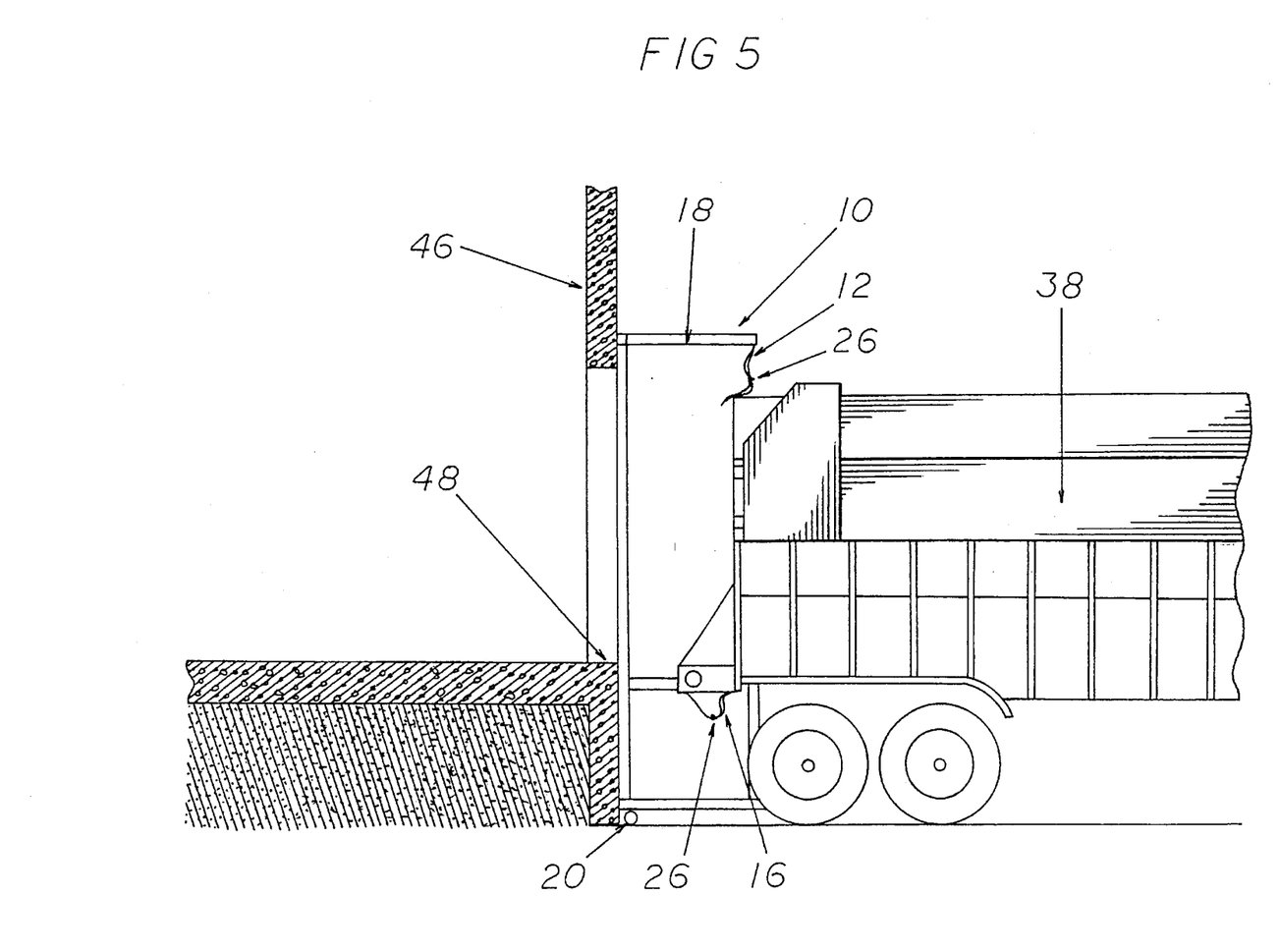
FIG. 5 is a side elevation cut-away view showing the relative positions of the Self Sealing Potato Truck Loading Dock to the warehouse loading dock and the potato truck when in the engaged position.

As shown in FIGS. 4 and 5, as the potato truck 38 backs into the Self Sealing Potato Truck Loading Dock 10 the top and the sides of the potato truck box 44 are entirely enclosed by the top double layered sealing canvas 12 and the side double layered sealing canvas 14. The lower half of the potato truck 38, containing the potato truck bed conveyor 40 and the potato truck bed conveyor door 42, is enclosed by the bottom double layered sealing canvas 16 as it fits snugly under these components of the potato truck box 44. This provides the air seal between the loading dock 48 and the potato truck 38 allowing for the unloading of the potato load without exposure to the outside air.

The frame 18 of the Self Sealing Potato Truck Loading Dock 10 fits against the outside wall of the warehouse 46 and around the outside edge of the loading dock 48. The top double layered sealing canvas 12, the side double layered sealing canvases 14, and the bottom double layered sealing canvas 16, fit snugly around the outside of the rear of the potato truck 38 by the use of bungee cords 26 located in the double layered sealing canvases 12, 14, and 16. This allows for the necessary flexibility and tension within the sealing canvases to conform to the varying shapes and designs of the rear of the potato truck 38.

Further, FIG. 4 is a representation of the Self Sealing Potato Truck Loading Dock 10 as seen as looking through from the inside of the warehouse loading dock 48. This view is representative of the Self Sealing Potato Truck Loading Dock 10 being permanently attached to the warehouse loading dock 48.

Figure 6:
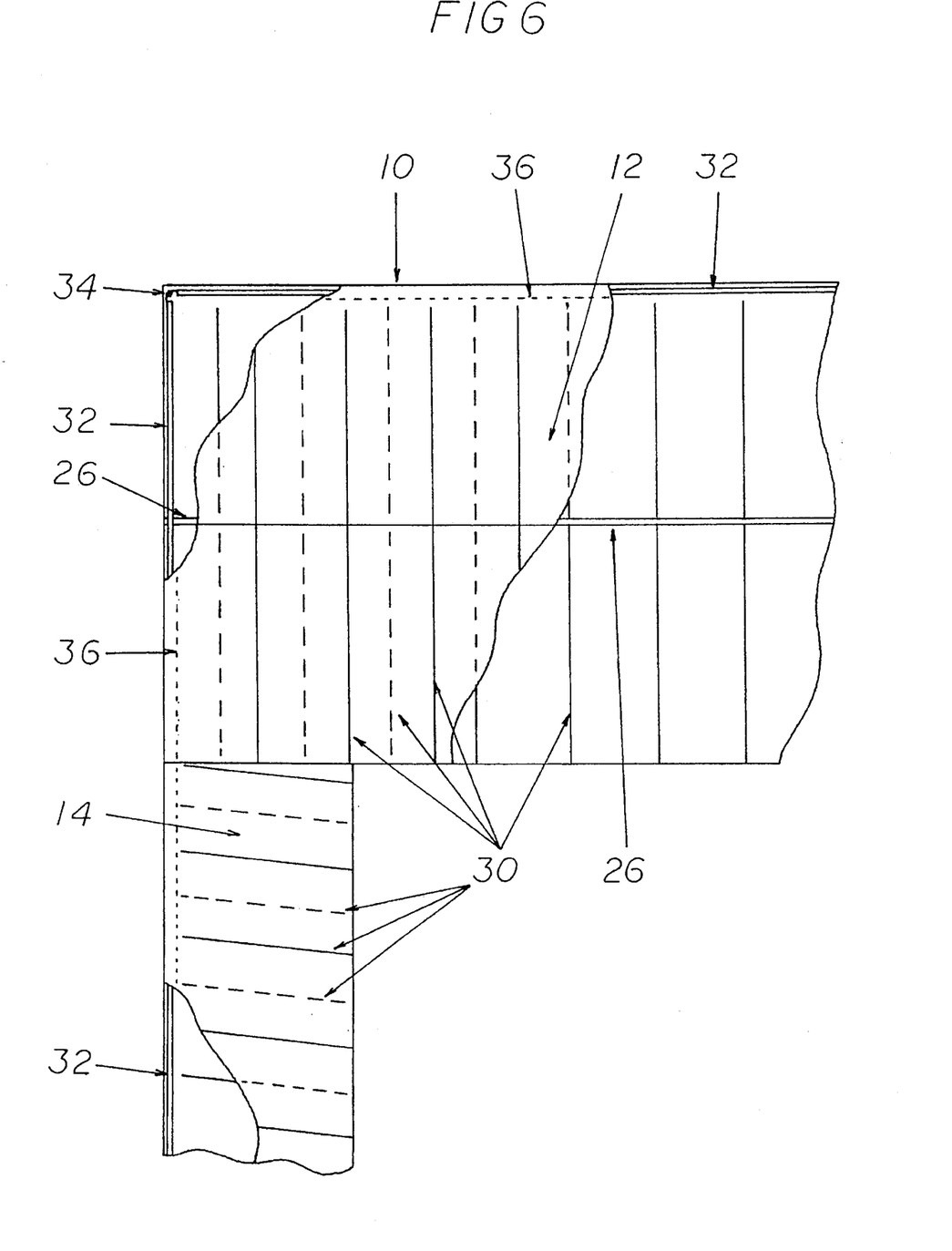
FIG. 6 is front elevation cut-away view of the top left corner of the Self Sealing Potato Truck Loading Dock showing the orientation of the alternating slits in the double layered sealing canvas and the position of the canvas mounting rod, the mounting rod hem, and the mounting rod bolt.
Figure 7:
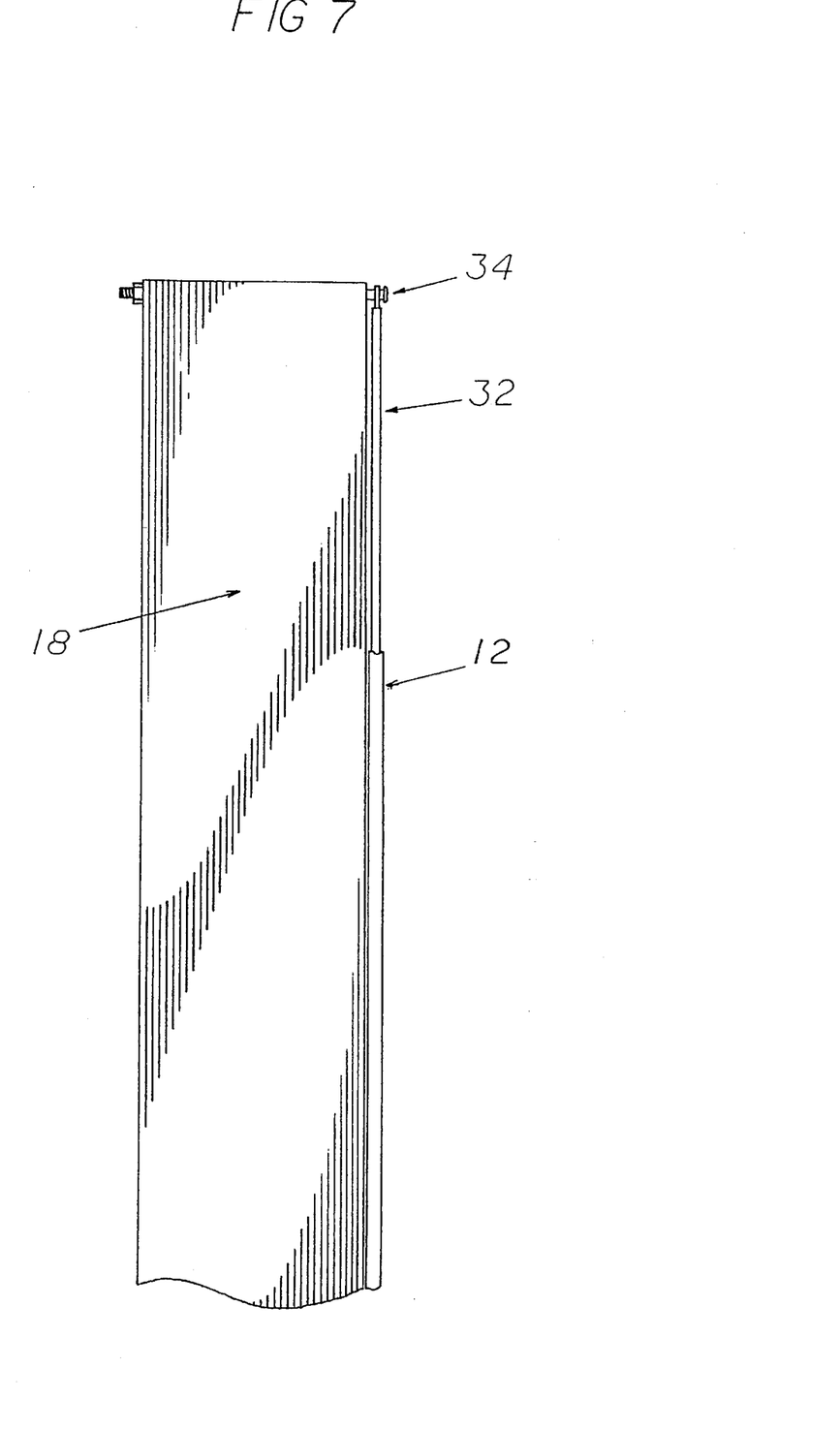
FIG. 7 is a side elevation cut-away view of the frame of the Self Sealing Potato Truck Loading Dock showing the orientation of the double layered sealing canvas, the canvas mounting rod, and the canvas mounting rod bolt to the frame of the dock.

As shown by FIGS. 6 and 7, the double layered sealing canvases 12, 14, and 16, are attached to the frame 18 of the Self Sealing Potato Truck Loading Dock 10 by means of the canvas mounting rod 32 which is in turn attached to the canvas rod mounting bolt 34 which is bolted trough said frame 18. The canvas mounting rod 32 is contained within the double layered sealing canvas by use of the mounting rod hem 36.

FIG. 6 also shows the double layered configuration of the double layered sealing canvases 12, 14, and 16, and the configuration of the double layered sealing canvas alternating slits 30. This design feature allows the alternating slits 30 open as necessary to conform to the shape of the potato truck 38 while maintaining the desired air seal because of their alternating position within the respective layers of the double layered sealing canvases 12, 14, and 16.

Although the present invention has been described in considerable detail with reference to certain preferred versions thereof, other versions are possible. Therefore, the spirit and scope of the appended claims should not be limited to the description of the preferred versions contained herein.

What is claimed:

1. A portable self sealing loading dock for use with a potato truck having rear doors, a center mounted conveyor and a pair of sides which slope inward towards said center mounted conveyor, said loading dock comprising:

a rectangular frame having a lower section defining a floor, an upper section defining a ceiling and a right and left section defining side walls;

a stand for said rectangular frame said stand being fixably attached to said rectangular frame and further extending below the floor portion of said frame;

a top double layered sealing canvas having an inside and outside layer with cut slats, said canvas being fixably attached to the front ceiling portion of said rectangular frame;

a right double layered sealing canvases having an inside and outside layer with cut slats, said right double layered sealing canvas being fixably attached at one edge to the front portion of said right side wall of said rectangular frame;

a left double layered sealing canvases having an inside and outside layer with cut slats, said left double layered sealing canvas being fixably attached at one edge to the front portion of said left side wall of said rectangular frame;

a lower double layered sealing canvas having an inside and outside layer with cut slats, said lower double layered sealing canvas being fixably attached along said lower double layered sealing canvas's bottom edge to the floor of said rectangular frame; and a means of adjustably and elastically attaching and holding in tension the top edge of said lower double layered sealing canvas to the side walls of said rectangular frame.

2. A loading dock as in claim 1 further comprising a plurality of wheels rotatably attached to the lower portion of said stand and a plurality of leveling pads adjustably attached to the lower portion of said stand.

3. A loading dock as in claim 2 wherein said cut slats alternate between said inside and outside layer of said canvases.

4. A loading dock as in claim 3 wherein said means of adjustably and elastically attaching said lower double layered sealing canvas to said side walls of said rectangular frame is an elastic cord having hooks on each end and the sides of said rectangular frame having a plurality of holes for receiving said hooks.

5. A loading dock as in claim 4 further comprising an upper elastic cord having a first and second end, attached at said first end to the floor of said rectangular frame and running through the left side double layered curtain, the top double layered curtain and the right double layered curtain and attached at send second end to said floor of said rectangular frame.

6. A self sealing loading dock fixably mounted to the side of building for use with a potato truck having rear doors, a center mounted conveyor and a pair of sides which slope inward towards said center mounted conveyor, said loading dock comprising;

a rectangular frame having a lower section defining a floor, an upper section defining a ceiling and a right and left section defining side walls;

a top double layered sealing canvas having an inside and outside layer with cut slats, said canvas being fixably attached to the front ceiling portion of said rectangular frame;

a right double layered sealing canvases having an inside and outside layer with cut slats, said right double layered sealing canvas being fixably attached at one edge to the front portion of said right side wall of said rectangular frame;

a left double layered sealing canvases having an inside and outside layer with cut slats, said left double layered sealing canvas being fixably attached at one edge to the front portion of said left side wall of said rectangular frame;

a lower double layered sealing canvas having an inside and outside layer with cut slats, said lower double layered sealing canvas being fixably attached along said lower double layered sealing canvas's bottom edge to the floor of said rectangular frame; and a means of adjustably and elastically attaching and holding in tension the top edge of said lower double layered sealing canvas to the side walls of said rectangular frame.

7. A loading dock as in claim 6 wherein said cut slats alternate between said inside and outside layer of said canvases.

8. A loading dock as in claim 7 wherein said means of adjustably and elastically attaching said lower double layered sealing canvas to said side walls of said rectangular frame is an elastic cord having hooks on each end and the sides of said rectangular frame having a plurality of holes for receiving said hooks.

9. A loading dock as in claim 8 further comprising an upper elastic cord having a first and second end, attached at said first end to the floor of said rectangular frame and running through the left side double layered curtain, the top double layered curtain and the right double layered curtain and attached at send second end to said floor of said rectangular frame.

* * * * *